Figure 1:
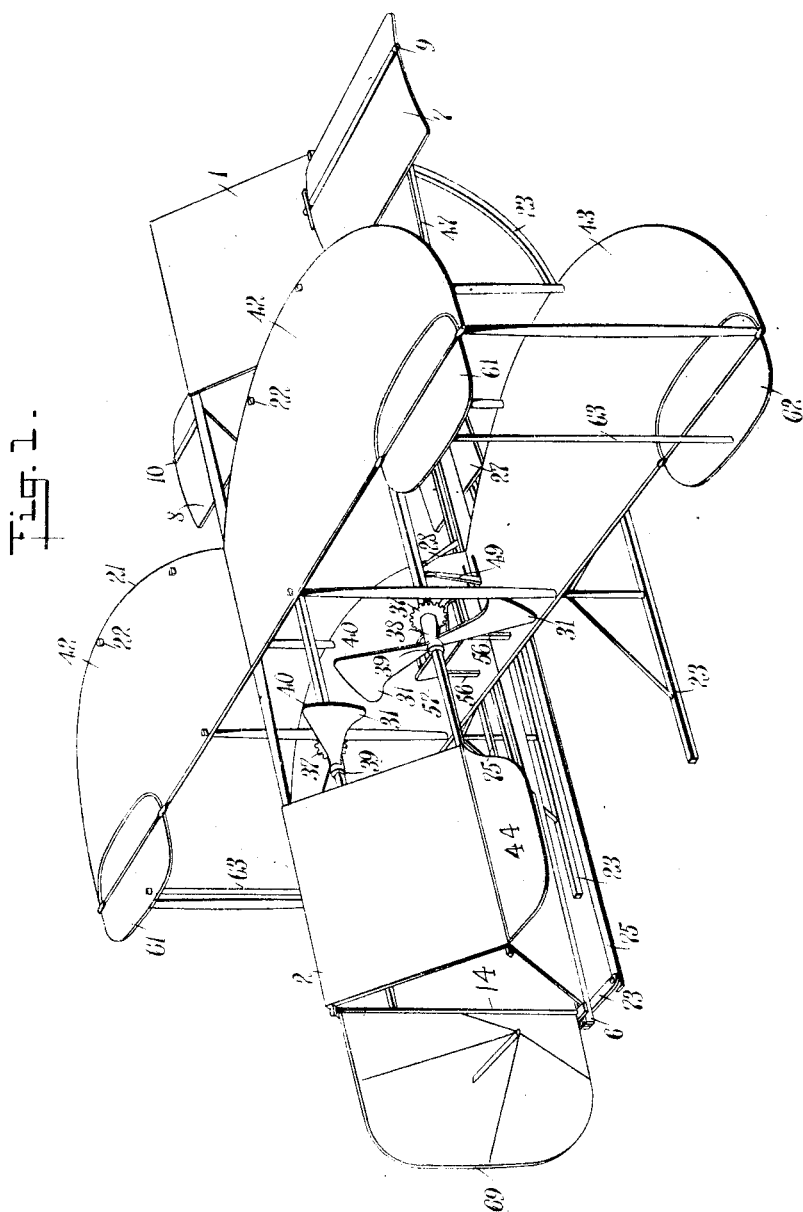

J. A. RABBITT.
AEROPLANE.
APPLICATION FILED AUG. 25, 1910.

1,037,658.

Patented Sept. 3, 1912.

7 SHEETS—SHEET 1.

WITNESSES:

INVENTOR
James A. Rabbitt
BY
ATTORNEYS

J. A. RABBITT.
AEROPLANE.
APPLICATION FILED AUG. 25, 1910.
1,037,658.
Patented Sept. 3, 1912.
7 SHEETS—SHEET 2.
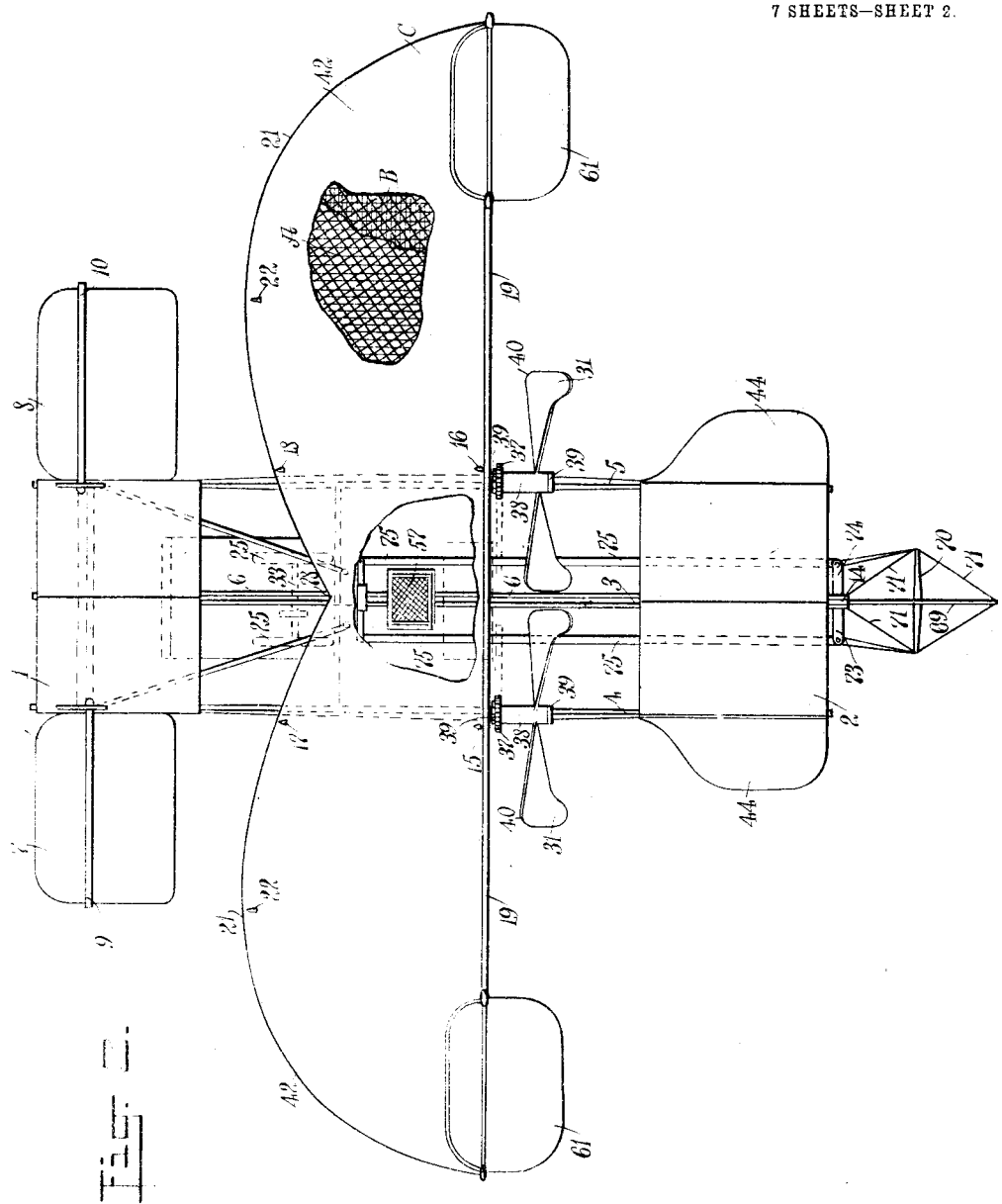
WITNESSES:
INVENTOR
James A. Rabbitt
BY
ATTORNEYS

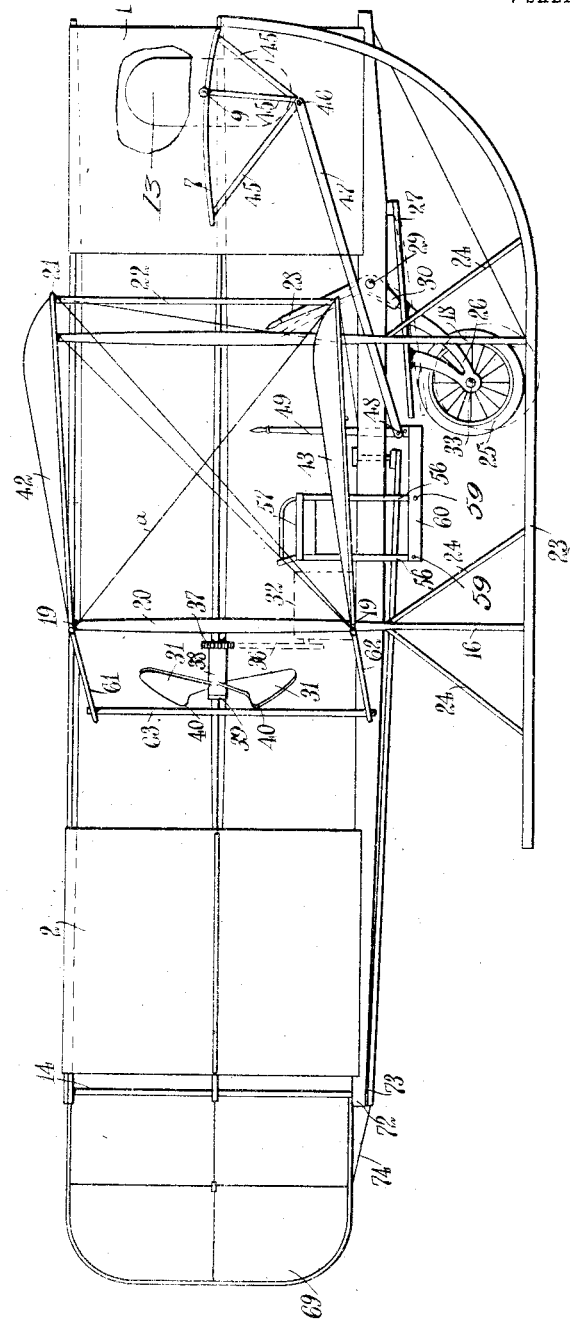

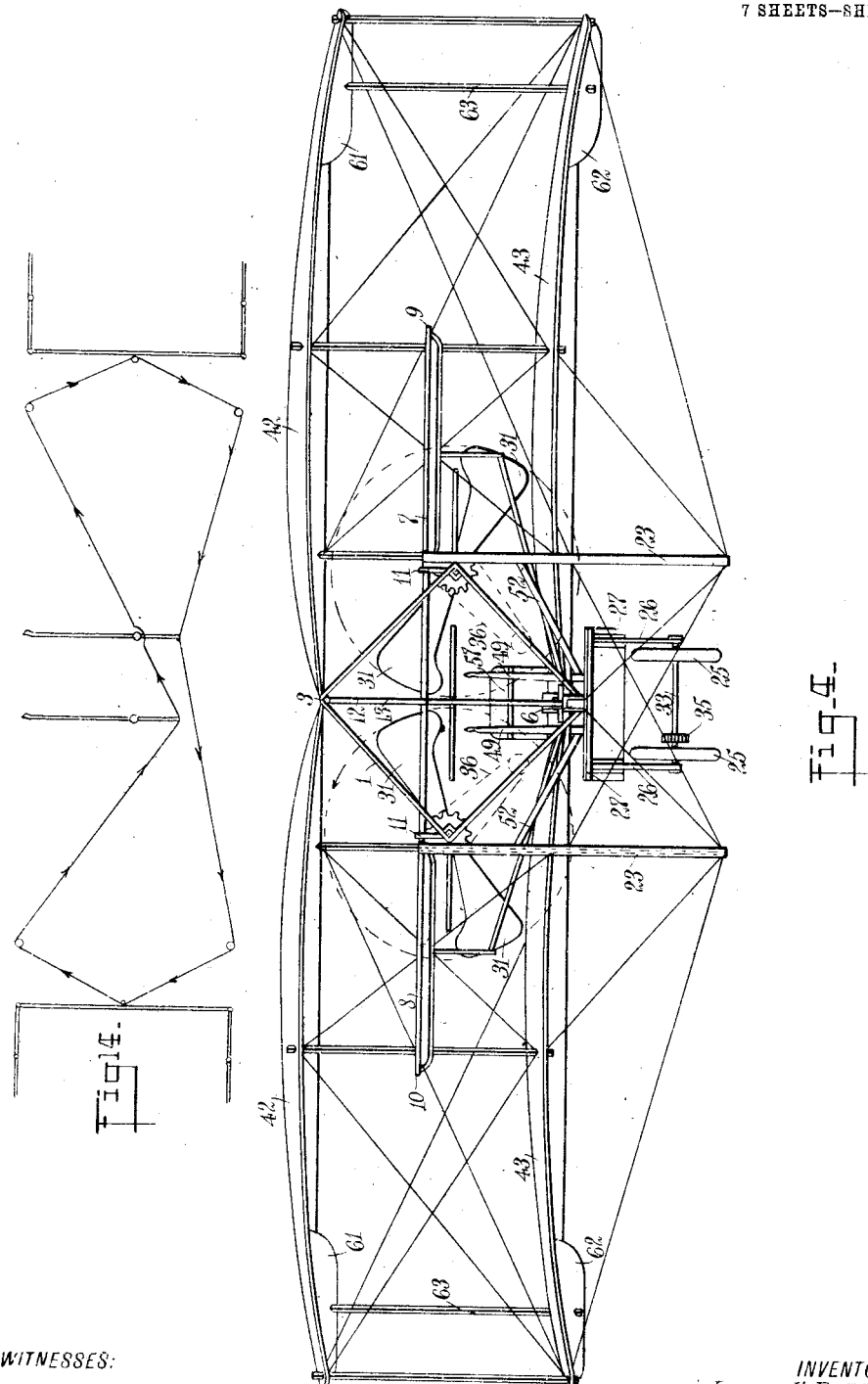

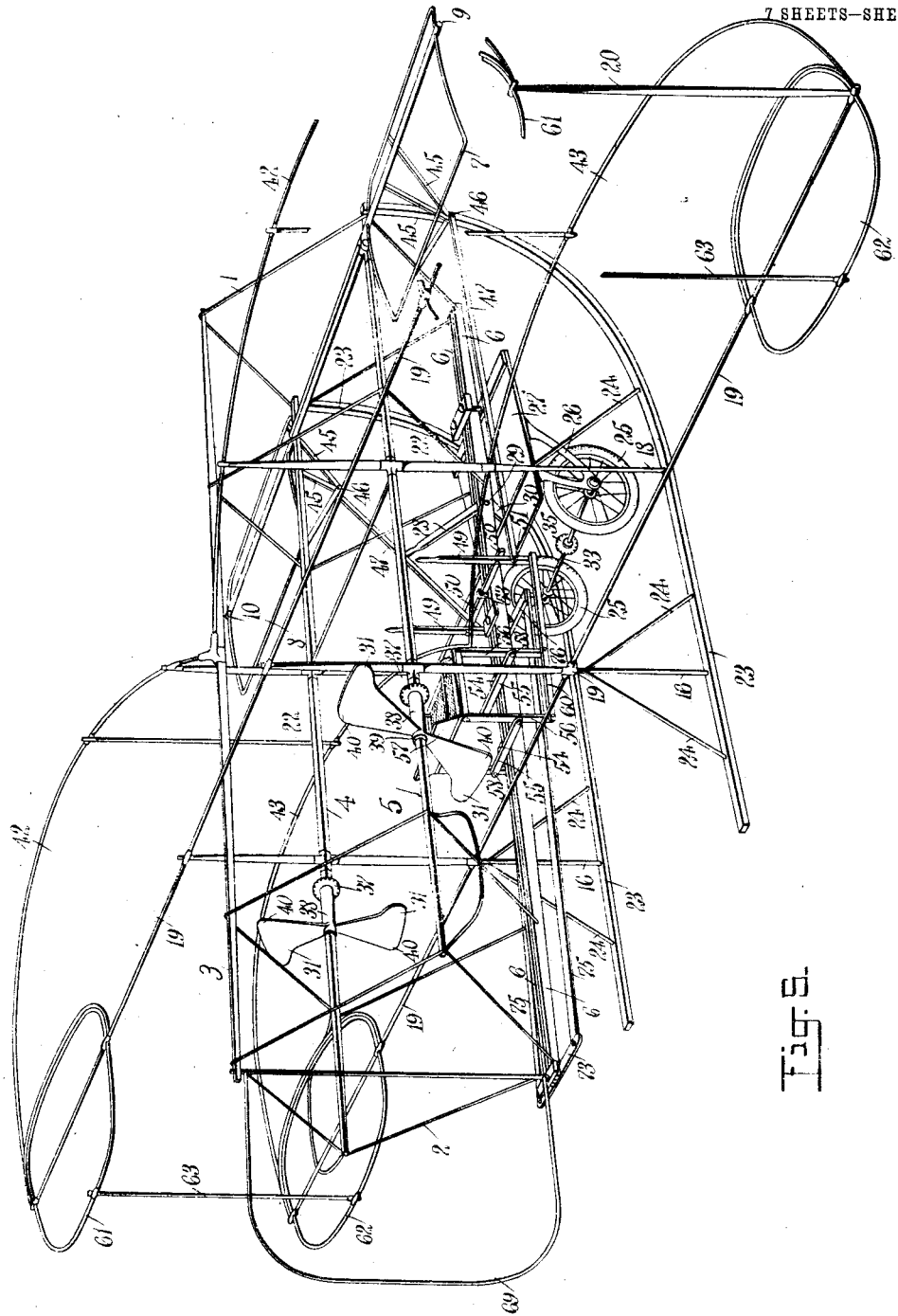

J. A. RABBITT.
AEROPLANE.
APPLICATION FILED AUG. 25, 1910.
1,037,658.
Patented Sept. 3, 1912.
7 SHEETS—SHEET 6.
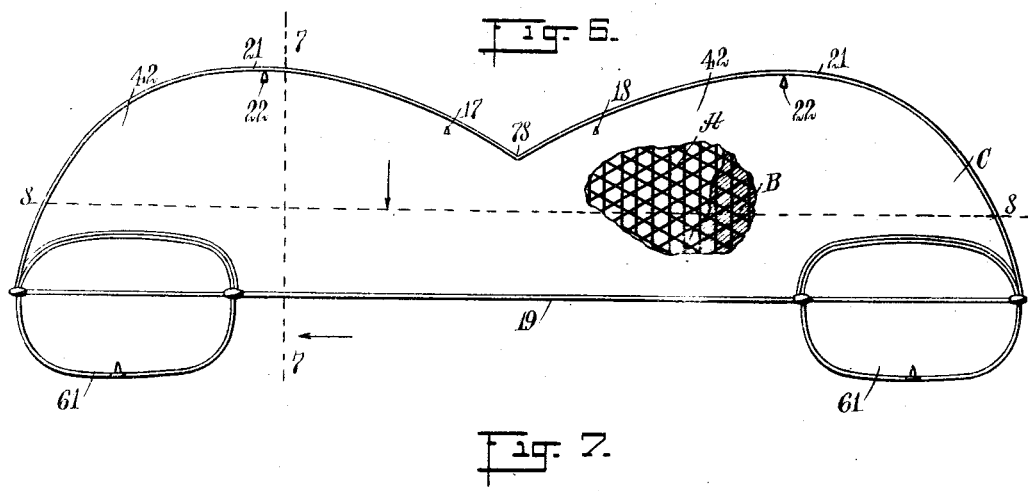
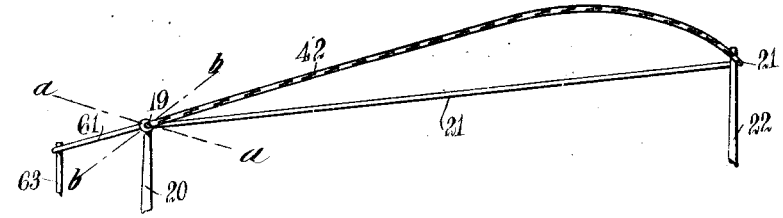
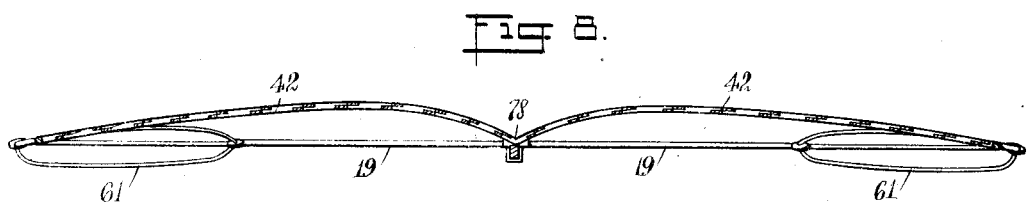
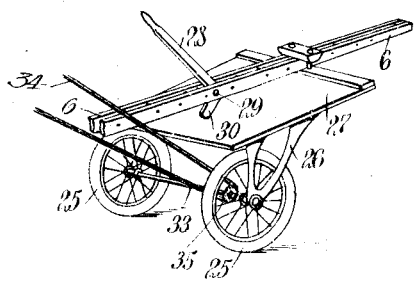
WITNESSES:
INVENTOR
James H. Rabbitt
BY
ATTORNEYS

J. A. RABBITT.
AEROPLANE.
APPLICATION FILED AUG. 25, 1910.

1,037,658.

Patented Sept. 3, 1912.

7 SHEETS—SHEET 7.

WITNESSES:

INVENTOR
James A. Rabbitt
BY
ATTORNEYS

UNITED STATES PATENT OFFICE.

JAMES ALOYSIUS RABBITT, OF YOKOHAMA, JAPAN.

AEROPLANE.

1,037,658.  Specification of Letters Patent.  Patented Sept. 3, 1912.

Application filed August 25, 1910. Serial No. 578,830.

*To all whom it may concern:*

Be it known that I, JAMES A. RABBITT, a citizen of the United States, and a resident of Yokohama, Japan, have invented a new and Improved Aeroplane, of which the following is a full, clear, and exact description.

Among the principal objects which the present invention has in view are: to provide an elongated rectangular main body frame having open ended tubular balancing members; to provide balancing members of the character described structurally formed to harmonize with the driving mechanism of the aeroplane; to provide supporting planes fixedly mounted upon the body structure and having upwardly convexed form; to provide levitating planes and operating gearing therefor; to provide balancing planes for automatically correcting the lateral balance of the machine; to provide a rudder and gearing for controlling the same, said gearing being foot operated by the aviator; to provide bearings for the propellers incorporated with the structural frame of the machine; to provide power driven traction means for propelling the machine by contact with the earth; to provide suitable skids for receiving the landing impact, said skids forming part of the structure of the machine; to provide means for controlling the disposition of the planes by the movement of the weight of the aviator; to provide a construction for the planes from light material; to provide a novel structure for the planes, which structure may be held against warp or twist; to provide an operating mechanism for the aeroplane, having the minimum number of parts and greatest simplicity of construction; to provide a body frame the supporting members whereof are increased in diameter transverse to the bending strain at the breaking moment thereof; and to provide a structural frame resilient in character and of minimum weight.

One embodiment of the present invention is disclosed in the structure illustrated in the accompanying drawings, in which like characters of reference denote corresponding parts in all the views, and in which—

Figure 10:
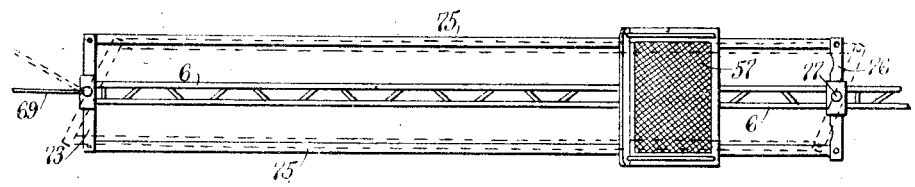
Figure 11:
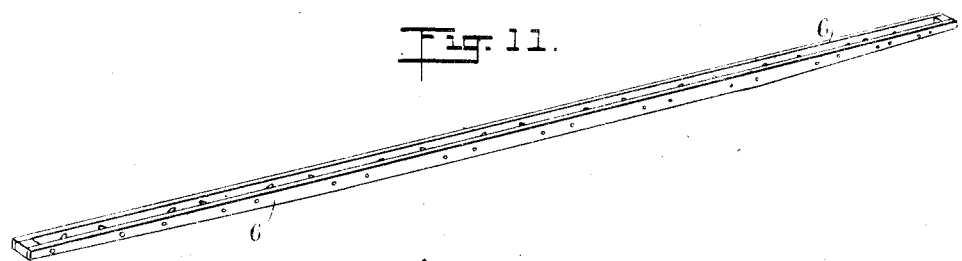
Figure 12:
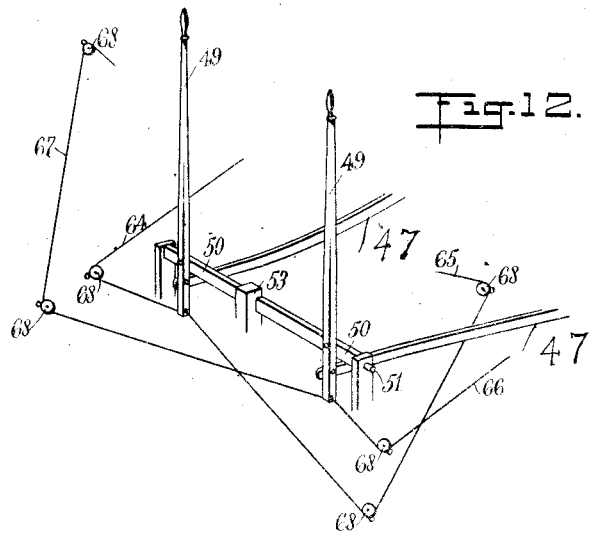
Figure 13:
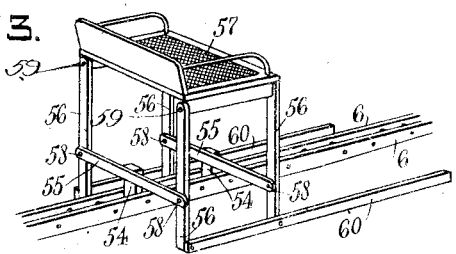

Figure 1 is a perspective view of an aeroplane constructed and arranged in accordance with the present invention; Fig. 2 is a plan view of the same; Fig. 3 is a side elevation of the same; Fig. 4 is a front elevation of the same; Fig. 5 is a perspective view of the structural frame denuded of the various planes; Fig. 6 is a detail view in plan of one of the main supporting planes, illustrating in the form of layers the body structure of the said planes; Fig. 7 is a horizontal section taken on the line 7—7 in Fig. 6; Fig. 8 is a longitudinal section taken on the line 8—8 in Fig. 6; Fig. 9 is a detail view in perspective, of the carrying wheels and mounting therefor; Fig. 10 is a detail view in plan, of the foot operated steering gear; Fig. 11 is a perspective view of the keel of the machine; Fig. 12 is a perspective view in detail, of the operating levers and transmission connections therefor; Fig. 13 is a perspective view in detail, illustrating the construction and mounting of the aviator's chair, and Fig. 14 is a diagrammatic view showing the means for manually controlling the ailerons.

The present construction varies most widely from the form of constructions showing the present state of the art in certain well defined distinctive features. These may be enumerated as follows: first, in the construction of the planes; second, in the employment of balancing members actuated by the shifting of the aviator's body; third, the operation of the steering rudder by means of the feet of the aviator and the mechanical means whereby this is accomplished; fourth, the manipulation of the levitating and balancing planes and the simplified mechanism whereby the same is accomplished; and, fifth, the construction and employment of self-contained earth contacted traction driving wheels which may be discontinued immediately the aeroplane is lifted from the ground.

The planes illustrated in the accompanying drawings, and hereinafter described, are shaped in forms peculiar and individual to each, and adapted to the particular work by it to be performed. The body structure, however, of each of the various planes bears a marked resemblance each to the other in that between the framing members of each plane is constructed a basket woven material A, having a large mesh, and constructed from a material such as split bamboo, light cane or other toughened fibrous material. The material, which is water proof or impervious to water, is preferably used for forming this woven body. When—as in the forming of the supporting planes—the plane is shaped or formed to other than a flat surface, this weaving is preferably executed over a form, producing a surface curvature of the desired shape. The interwoven strands are firmly secured to the surrounding frame, and thus forms a reinforcing construction for the planes light and exceedingly strong. Either before or after the woven reinforcement has been attached to the frame of the plane, a thin, light Japanese paper B is glued preferably to the under-side of the said reinforcement. For this I have selected a paper of a very fibrous nature, which when pressed sinks between the bamboo of the woven material A to form on the under side of the planes a honeycombed or cellular surface, said paper having a grain adapted to resist a tremendous carrying strain in one direction. When the lower covering is properly attached, I cover the upper surface of the reinforcement with a covering of light muslin C. Care is exercised in applying the muslin to cross the grain of the paper above mentioned, whereby a tensile strength is attained equal to the full strength of each of the coverings. When the covering is structurally completed I coat the same with a light coating of shellac, thus rendering the fabric impervious to water. In this manner I have produced the lightest form of levitating plane commensurate with the full lifting strength required. I do not know of a material which has the same resistance to tear or puncture, and tensity in maintaining its longitudinal form, as that herein above described.

The planes constituting the supporting and operating members of the present aeroplane are carried on a body frame, of which longitudinally disposed struts 3, 4 and 5 and a keel 6 constitute the main frame. The struts and keel are supported in triangular arrangement by open ended full sided box tubes 1 and 2. Of the box tubes, that designated by the numeral 1 is disposed at the extreme forward limit of the said struts and keel, while the box tube 2 is disposed at the extreme rearward limit of the said struts and keel. Levitating planes 7 and 8 are extended laterally from the horizontally disposed angles of the structure of the tube 1, being pivoted upon pivot rods 9 and 10, which are mounted in bearings formed in brackets 11, 11 set out from and fixedly attached to the struts 4 and 5. The pivot rods 9 and 10 maintain the structural spread of the struts 3 and 4 at the forward end of the machine. The keel 6 and the strut 3 are maintained in supported relation by a rod 12, upon which is fixedly mounted a vertical steadying vane 13. At the rear of the machine the strut 3 and the keel 6 are maintained in separated position by a rudder post 14. No cross brace is required at this point, the struts 4 and 5 being held in separated position by standing members 15, 16, 17 and 18, to which the said struts 4 and 5 are fixedly secured. The standing members 15 and 16 are maintained in structural position by cross braces 19, 19 constituting the structural frame support for the rearward edges of the planes. The outer ends of the cross braces are extended to the extreme lateral dimension of the machine, and are there joined by connecting rods 20, 20. The standing members 17 and 18 are braced in vertical disposition by bowed frames 21, 21. The frames 21, 21 are constructed from any suitable material, and preferably in a double layer or structure, such as is known in like constructions wherein it is desired that there be avoided the disadvantages incident to the grain of the wood or material constituting the frame. In the present instance the frames are bent in the shape substantially as shown in Fig. 2 of the drawings. The outer ends of the frames are secured each to the connecting rods 20, 20 respectively. The opposite ends of the said frames are fixedly secured to the upper ends of the standing members 15 and 16 respectively. The said frames cross each other at 78, where they are securely and fixedly fastened each to the other. The frames 21, 21 are likewise fixedly attached to the standing members 17 and 18. Disposed between the upper and lower planes, when bi-planes are used, are connecting rods 22, 22, which are fixedly attached to the frames 21, 21, reinforcing and bracing the construction of the outwardly extended planes 42 and 43.

The parts above described, constructed and arranged in the manner shown, form the skeleton frame of the machine. The struts and keel members are constructed from thin wood, the central portion whereof is gradually increased, as seen in Fig. 11 of the drawings, the increased dimension being provided at the point which may be designated as the breaking moment in the said member. The connecting rods and standing members, whose duty it is to support and carry, are preferably constructed from hollow bamboo, having piano wire threaded therethrough, and disposed to receive the supporting load while permitting the said members to carry the superimposed weight. In this manner a resilient but strong skeleton frame is constructed. All standing members are reinforced and guided in upright position by suitable guy lines a, a, constructed from piano wire in the manner shown in the drawings, and particularly in Figs. 3, 4 and 5 thereof.

The aeroplane is supported, when resting upon the ground, by runners 23, 23. The runners 23, 23 are fixedly mounted upon the lower ends of the standing members 15, 16, 17 and 18, upon which they are further braced by angle braces 24, 24. The runners 23, 23 are given a long upward curve at the front end of the machine, and at the upper end of the said runners they are fixedly secured to the struts 4 and 5. The said runners 23, 23 are, in the present machine, designed to provide means for alighting after a flight, and also for supporting the machine when resting upon the ground. When starting the flight the runners 23, 23 are lifted off of the ground by means of wheels 25, 25.

The wheels 25, 25 are pivotally mounted in brackets 26, fixedly attached to and depended from a platform 27. The platform 27 is pivotally attached to the keel 6 of the machine. The platform 27 and wheels 25, 25 connected therewith, are depressed to the position shown in dotted lines in Fig. 3 of the drawings, by a lever 28. The lever 28 is pivotally mounted at 29 between the members of the keel 6. The lever 28 is provided with a short extension 30, the squared end of which is adapted to rest upon the surface of the platform 27 when the hand hold of the lever 28 is depressed to extend the wheels 25, 25 into carrying position. When the lever 28 is thus depressed, the squared end of the extension 30 holds the lever in position, and thus locks the platform 27 and the wheels 25, 25 in operative position. It is in this position that the flight is initiated. It will be seen that the wheels 25, 25 raise the frame of the machine partially from the ground. This may be aided by the aviator throwing his weight forward to balance the machine upon the wheels 25, 25.

The machine is propelled by means of the wheels 25, 25 and propellers 31, 31. The motive power supplied for the driving of both the wheels and propellers is imparted by a motor 32, which may be of any suitable form for aeroplane propulsion. Connecting the said motor 32 and the axle 33 to which the wheels 25, 25 are fixedly attached, is a driving chain or belt 34, as seen best in Fig. 9 of the drawings. To receive the said belt the axle 33 is provided with a pulley 35. In the extended position of the wheels 25, 25 the belt 34 is tightened so that the axle 33 and wheels connected therewith are driven by the said belt. But when the lever 28 is raised to the position shown in Fig. 3 of the drawings, the air pressure on the under side of the platform 27 lifts said platform and wheels connected therewith to the position shown in said Fig. 3, and slackens the belt 34, and so discontinues the rotation of the axle 33.

The propellers 31, 31 are driven by chains 36, 36, which are suitably connected to the motor 32 and to sprocket wheels 37, 37, fixedly mounted in tubular bearing hubs 38, 38. To receive the hubs 38, 38 the struts 4 and 5 are provided with suitable bearings surrounding the said struts and rigidly secured thereon. To aline and hold the hubs 38, 38 in position the bearings mounted upon the said struts are secured in position by collars 39, 39. By means of this construction there is provided an elongated bearing for the propellers 31, 31 directly mounted and held in line with the struts constituting the frame of the machine whereby there is imparted to the structural form of the machine a direct propelling thrust. In initiating the flight it will be understood that the propellers 31, 31 are started simultaneously with the driving of the wheels 25, 25, aiding in the propulsion of the machine at that time, and when sufficient speed has been attained to lift the machine from the ground, continuing their revolutions for the propulsion of the machine through the air. The hubs 38, 38 are supported on the bearings by means of any suitable rolling bearings, the length of the bearings and hubs facilitating such construction.

The present machine is constructed in the form of what is known as a bi-plane. Supporting planes 42 and 43 are preferably duplicated, and are disposed in parallel relation and in direct vertical line. The planes 42 and 43 are composed of two substantially semicircular members, formed by the cross braces 19, 19 and the bent frames 21, 21. As above stated, the inner ends of the frames are crossed, as shown in Fig. 2 of the drawings, to produce wing-like extensions, and are secured each to the cross brace 19 between the two ends of the opposite frame. Secured rigidly upon the said wing extensions and cross braces is a cover constructed in accordance with the description herein above set forth. The covers for the planes 42 and 43 are curved upwardly to form concave under surfaces. The curved lines of the said planes 42 and 43 are shown in Figs. 3 and 4. In Fig. 3 the line of curvature illustrated is extended fore and aft, or parallel with the longitudinal extension of the machine, while the extension of the curve illustrated in Fig. 4 of the drawings is transverse to the longitudinal extension of the machine. It will be noticed that the highest point of convexity of the planes, when viewed from the side, is advanced toward the forward edge of the planes, and when viewed from the front, is carried toward the center of the machine or the crossed area of the said planes.

The formation of the planes to the lines illustrated produces a more lifting and buoying surface for the carrying of the aeroplane. By forming the planes in the manner shown in plan in Fig. 2 of the drawings, the widest dimension of the wing extensions is disposed at some distance from the center of the machine. At the center of the machine the crossed areas of the wings form a contracted or waist-like area, the lift of which is considerably less than that of of the extended portions of the said wings, while the structural strength is greatly augmented and which forms a passage for upper air currents.

The walls of the tubes 1 and 2 are formed from the same covering material above described, the walls being secured rigidly in rectangualr form, shown in Fig. 1. The tubes 1 and 2, when employed on machines designed for rapid flight, are flattened. Within the tube 1 is vertically mounted the vane 13, the extension of which is parallel with the longitudinal extension of the aeroplane. The object of the vane 13 is to correct any eddying tendency within the tube 1, and to overcome any tendency on the part of the machine to lateral sway. Extended from the outwardly projected angles of the tube 2 are fins 44, 44. The fins 44, 44 are fixedly connected and have a steadying effect on the flight of the machine, balancing and holding in true projected plane the tube 2 and frame connected therewith. The vane 13 and fins 44, 44 are formed from the above described covering material, the same being stretched upon and held rigidly by suitable framing material.

The machine herein described is controlled by the levitating planes 7 and 8. These planes are shaped substantially as shown in Figs. 1, 2 and 3 of the drawings, having a curved formation from the forward to the rear edge, and having an area calculated to the needs of the machine. The said planes 7 and 8 are constructed of suitable frames covered with the covering material above mentioned, and rigidly mounted upon the pivot rods 9 and 10 respectively. In operation, the planes 7 and 8 are inclined from the horizontal to extend the forward section thereof upward or downward. Depending upon the altitude of the forward edge of the planes 7 and 8 with regard to the horizontal line of the extension of the machine, is the upward or downward flight of the machine. Further, when constructed as herein shown, wherein the planes are disconnected, by the operation of either of the planes independently of the other plane, the machine may be deflected on its longitudinal axis to slightly tilt the machine laterally while making a downward or spiral swoop.

When the planes 7 and 8 are held in mutual alinement, and in the position where in the machine is flying on a level path, the rear end of the said planes being downwardly dipped, as shown, forms a sufficient brake to steady the planes and the action of the machine. This action on the part of the planes 7 and 8 is very similar to that of the action of the rudder, wherein the best results are obtained when a light and steady pressure is constantly exerted upon the one side of the rudder.

The planes 7 and 8 are harnessed by braces 45, 45, said braces being triangularly arranged and pivotally connected at 46 to connecting rods 47, 47. The rods 47, 47 are pivotally connected at 48 to levers 49, 49. The said levers are pivotally connected to rocking bars 50, 50. The rocking bars 50, 50 are provided with pivotal extensions 51, 51, which are mounted in bearings in the brace members 52, 52, and post 53, which are connected directly to the keel 6 of the machine, and constitute part of the frame thereof.

Between the members of the keel 6 are fixedly mounted supporting blocks 54, 54. Upon the blocks 54 are fixedly mounted cross bars 55, 55. At the outer ends of the bars 55, 55 are pivotally mounted the legs 56, 56 of the aviator's chair 57. The legs 56, 56 are pivotally connected at 59, 59 to the said chair and also pivotally connected at 58, 58 to the cross bars 55, 55 and extended downward below the said pivotal connection and fixedly attached to bars 60, 60. The bars 60 are extended forward and rest against the sides of each of the levers 49, 49. The disposition and arrangement of the chair 57 and its supporting members, together with the bars 60, 60 and the levers 49, 49, is such that any rocking of the chair 57 upon its pivotal connections laterally moves the bars 60, 60 coincidently to press upon the lower extension of the levers 49, 49 to thrust the same to the one or the other side, as the case may be. The purpose of this construction is to operate the balancing wing tips 61, 61 and 62, 62 with which the planes 42 and 43 are provided. The wing tips are pivotally mounted upon the braces 19, 19 at the outer extremities thereof, and are shaped in the form shown in Figs. 2 and 3 of the drawings. Any suitable hinged mounting of the said tips upon the said braces 19 may be adopted. At the outer edge the frames of the tips 61 and 62 are joined by connecting rods 63, 63. The wing tips are adapted to be raised at their forward edges above and below the planes 42 and 43, and are manipulated to thus act by means of the operating harness consisting of cables 64, 65, 66 and 67. By rocking the wing tips 61, 62 on their pivotal bearings, it will be observed that there are formed openings between the said tips and the body of the planes to which they are connected, which openings form passageways for the upward currents of air. These upward currents of air have a steadying effect upon the planes in which they occur. The cables 64 and 65 are each connected to the one lever 49 at the lower end thereof, and the cables 66 and 67 are each attached to the other lever 49 at the lower end thereof. The cables are reeved about suitable pulley blocks 68, 68 and connected to the connecting rods 63, 63. The cables 65 and 67 are reeved over blocks 68 attached to the upper braces 19 (see Fig. 12), and from thence extended to the middle of the connecting rods 63, while the cables 64 and 66 are reeved over blocks mounted on the lower rod 19 and attached to the said connecting rods at the same point. It will be noticed that the disposition of the cables is such that they work in harmony, and are so disposed that when the rod 63 on the one side of the machine is raised, the rod 63 on the opposite side of the machine is depressed.

With a construction arranged as above described the tilting of the aeroplane, to which such machines are liable, would result in the instant rocking of the chair 57, caused by the inertia of the heavier mass of the aviator's body operating to shift the bars 60, 60 against the sides of the opposite levers 49, 49 to move the same to dispose the tips 61 and 62 at angles against the wind pressure corrective and adapted to return the machine to its equilibrium. As the machine is returned to its equilibrium it will be seen that the chair 57, in righting itself, returns the tips to their normal position in proper extension of the planes 42 and 43. It will also be seen that in flight, wherein it is desired to imitate the swoop of a bird, the levers 49, 49 may be individually operated by depressing either longitudinally to change the angle of either of the levitating planes 7 and 8, and at the same time move both levers 49, 49 to dispose the tips 61, 61 and 62, 62 to assist in the canting or tilting effect caused by the above mentioned disposition of the planes and tips. Thus, it will be observed that the arrangement and construction of the levers 49, 49, the levitating planes 7 and 8 and the wing tips 61 and 62, give to the aviator a scope of control of the aeroplane herein described, greater than presented by constructions heretofore devised.

The lateral path of the aeroplane is controlled by a rudder 69. The rudder 69 is a straight plane fixedly mounted on the vertical post 14, and having an area the dimensions of which are regulated by the needs of the machine. The frame of the rudder is reinforced by a transversely disposed rod 70, the ends whereof are extended from the sides of the rudder and connected to the edge of the frame thereof by means of guy lines 71, 71. The post 14 is pivotally mounted in the end of the strut 3 and in a plate 72, bridging the space between the parallel members of the keel 6. Fixedly attached to the lower end of the post 14 is a tiller 73. The tiller 73 is connected by means of guy lines 74, 74 with the rudder 69, and to the portion thereof which is removed from the post 14, thus reinforcing the strain on the rudder and post. The tiller 73 is pivotally connected to tiller rods 75, 75. The rods 75, 75 are pivotally connected to a pivoted foot brace 76. The foot brace 76 is provided with a pivot 77 pivotally mounted in the frame of the keel 6. The foot brace 76 is disposed in suitable relation to the chair 57, so that the aviator, seated in the said chair, uses the brace 76 as a foot rest. By shifting the brace 76 with his foot the aviator, when operating an aeroplane constructed in conformity with this invention, directly controls the horizontal path traveled by the said aeroplane.

The operation of the machine constructed as above described, and as shown in the accompanying drawings, is as follows: When the machine is at rest upon the ground the runners 23, 23 support the same, as shown in Fig. 3 of the drawings. The aviator enters the car, and by reaching forward he depresses the lever 28 until the short end 30 thereof forces downward the platform 27 and the wheels 25, 25 connected therewith. This action uptilts the machine, which rests at this moment upon the wheels 25, 25 and the rear end of the runners 23, 23. As explained, the squared end of the extension 30 locks the lever 28 in position wherein the said platform and wheels carried thereby are extended. The motor 32 is now started. When the said motor has attained its speed the clutches are thrown in, starting the propellers 31, 31 and the wheels 25, 25. In this position the aviator may facilitate the action by slightly shifting his weight forward until the pressure on the rear of the runners 23, 23 is nullified. The machine, operating through both the propellers and the traction of the wheels upon the earth, gradually gathers headway until the speed is sufficient to deflect the planes 7 and 8 to lift the forward end of the machine. Immediately the planes 42 and 43 are presented at a levitating angle, resulting in lifting the machine clear of the ground. The propulsion from this point is by means of the propellers 31, 31. When the machine has been raised at a safe distance from the ground, the aviator, by lifting the lever 28, releases the platform 27, which is immediately thrown to the position shown in Fig. 3 of the drawings, by the air pressure exerted on the forward side of the said platform. In this position the said platform will remain until after the alighting of the machine.

The flight having been thus established, the aviator, by operating the levers 49, 49 and the foot brace 76, may and will have perfect control of the aeroplane, governing its horizontal and vertical path, and, if desired, imparting thereto a spiral course in the manner above described. While controlling the machine by means of the mechanism herein described, the aviator's attention is not so completely required to guard against tilting of the machine, for the reason that, as explained, any swerve or tilt of the machine results in the automatic correction thereof through the operation of the swing of the aviator's body and chair. If this swing in itself is not totally sufficient to balance the machine, it, at least, positively directs the attention of the aviator to the action of his machine, leaving to him thereafter, by the handling of the levers 49, 49, the perfect righting or balancing of the machine.

Having thus described my invention, what I claim as new and desire to secure by Letters Patent is:—

1. An aeroplane, comprising an elongated skeleton frame; a plurality of tubular chambers extended in line with and fixedly mounted on said frame; levitating planes pivotally mounted upon the one of said tubular chambers and horizontally extended therefrom; a vertically disposed flat vane extended in the longitudinal center of said frame and mounted on the said chamber supporting said levitating planes; a rudder vertically pivoted on the rearmost of said chambers; horizontally extended vanes fixedly mounted on said rearmost chamber; a carrying plane laterally extended from and fixedly mounted on said frame; means for propelling the aeroplane in flight; and means for varying the path of the flight vertically and horizontally.

2. An aeroplane, comprising an elongated skeleton frame; a plurality of tubular chambers extended in line with and fixedly mounted on said frame; a carrying plane laterally extended from and fixedly mounted on said frame; levitating planes pivotally mounted upon the one of said tubular chambers and horizontally extended therefrom; a plurality of balancing planes pivotally mounted upon said carrying plane and at the opposite extremes thereof; manually operated means for controlling the said levitating and balancing planes in unison; means for propelling the aeroplane in flight; and means for varying the path of the flight vertically and horizontally.

3. An aeroplane, comprising an elongated skeleton frame; a plurality of tubular chambers extended in line with and fixedly mounted on said frame; a carrying plane laterally extended from and fixedly mounted on said frame; levitating planes pivotally mounted upon the one of said tubular chambers and horizontally extended therefrom; a plurality of balancing planes pivotally mounted upon said carrying plane and at the opposite extremes thereof; a plurality of universally pivoted levers mounted upon said frame; a plurality of devices connecting each of said levers with one of said levitating and balancing planes on each side of the longitudinal center of the aeroplane, to operate in harmony and independently of the said levitating and balancing planes disposed on the opposite side of the aeroplane; means for propelling the aeroplane in flight; and means for varying the path of the flight vertically and horizontally.

4. An aeroplane, comprising an elongated skeleton frame; a plurality of tubular chambers extended in line with and fixedly mounted on said frame; a plurality of carrying planes laterally extended from and fixedly mounted on said frame, said planes having a smooth upper surface and an open cellular under surface; levitating planes pivotally mounted upon the one of said tubular chambers and horizontally extended therefrom; a plurality of balancing planes pivotally mounted upon said carrying plane and at the opposite extremes thereof; manually operated means for controlling the said levitating and balancing planes in unison; means for propelling the aeroplane in flight; and means for varying the path of the flight vertically and horizontally.

5. An aeroplane, comprising an elongated skeleton frame; a plurality of tubular chambers extended in line with and fixedly mounted on said frame; a plurality of carrying planes laterally extended from and fixedly mounted on said frame, said planes being constructed of an open mesh woven material and a smooth upper covering therefor to form cells in the under surface downwardly opening; levitating planes pivotally mounted upon the one of said tubular chambers and horizontally extended therefrom; a plurality of balancing planes pivotally mounted upon said carrying plane and at the opposite extremes thereof; a plurality of universally pivoted levers mounted upon said frame; a plurality of devices connecting each of said levers with one of said levitating and balancing planes on each side of the longitudinal center of the aeroplane, to operate in harmony and independently of the said levitating and balancing planes disposed on the opposite side of the aeroplane; means for propelling the aeroplane in flight; and means for varying the path of the flight vertically and horizontally.

6. In an aeroplane such as described, carrying planes having a smooth upper surface and a cellular under surface, the cells of said under surface opening downward and having full sides to form air-holding pockets.

7. In an aeroplane such as described, a carrying plane inclined toward the line of flight and having a cellular under surface, the cells of said surface having full sides extended approximately perpendicular to the body of said plane to present the opening of said cells obliquely toward the line of flight, to form air-holding pockets for said plane.

8. In an aeroplane such as described, a carrying plane constructed from a fiber woven to form an open mesh, said fiber being shaped and set to the form desired for said plane, and said fiber being covered with a smooth material, to form an unbroken surface, said material being adhered to said fiber.

9. In an aeroplane such as described, a carrying plane therefor, constructed of woven material, the mesh whereof is open, said woven material being covered on top with a smooth material to form an unbroken surface, and said woven material being covered at the bottom, the bottom covering material being pressed within said mesh to form downwardly-opening air-holding pockets on the under side of said plane.

In testimony whereof I have signed this specification in the presence of two subscribing witnesses.

JAMES ALOYSIUS RABBITT.

Witnesses:
  ROGER CULVER TREDWELL,
  H. B. ALBRIGHT.